Sept. 26, 1939.   O. W. GITHENS ET AL   2,174,155
MOTION PICTURE CAMERA
Filed April 7, 1937   3 Sheets-Sheet 1
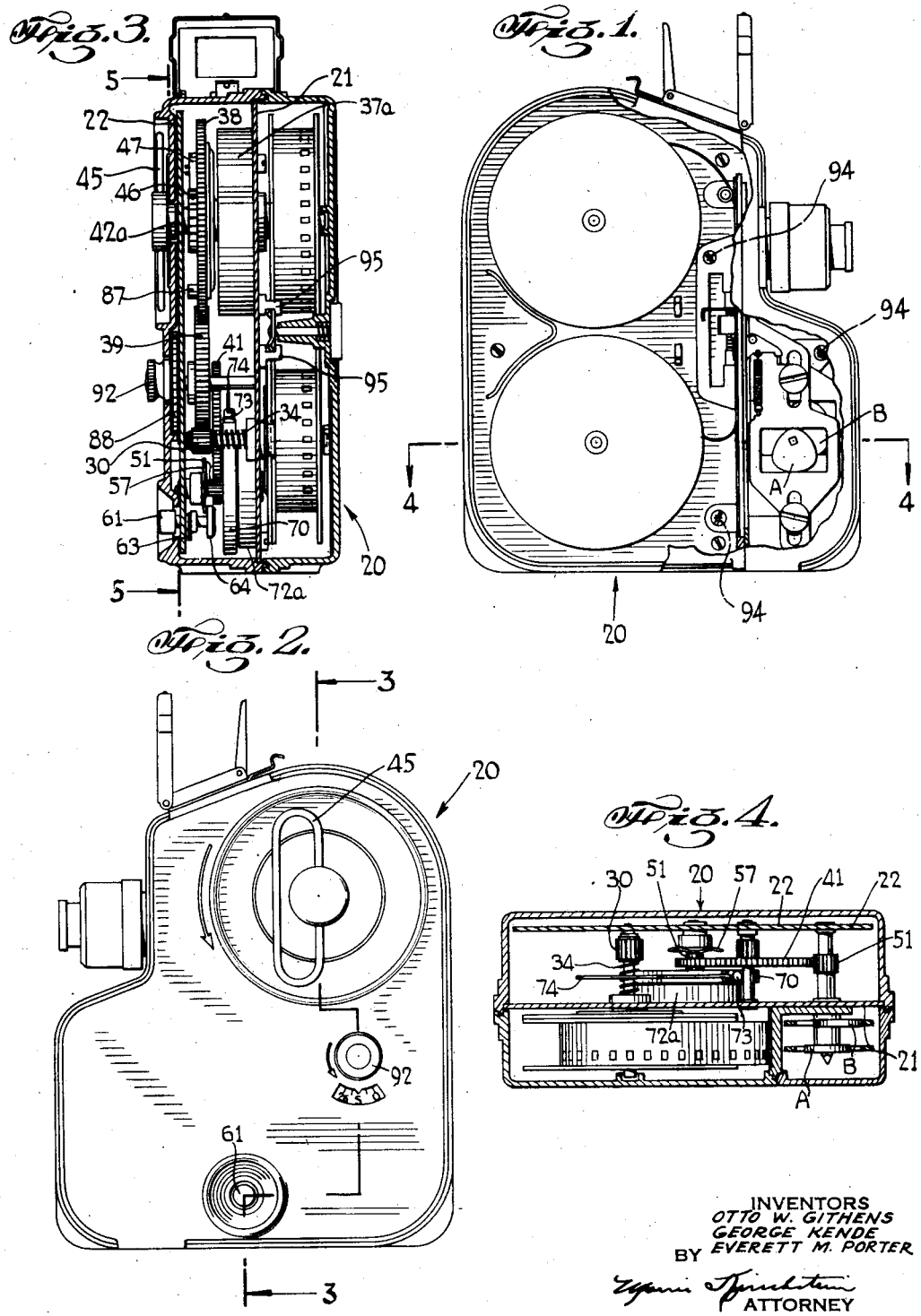
INVENTORS
OTTO W. GITHENS
GEORGE KENDE
EVERETT M. PORTER
BY
ATTORNEY

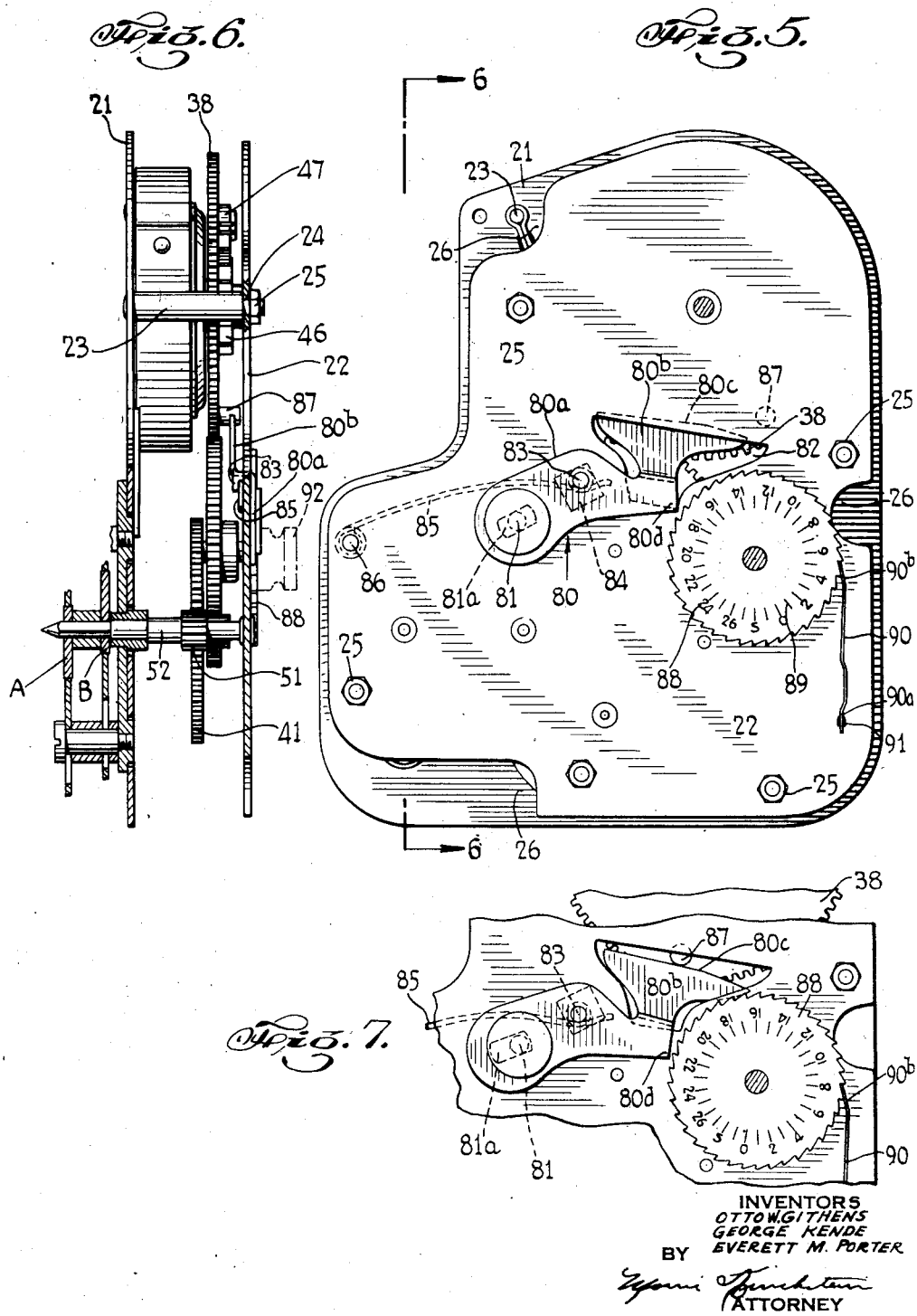

Sept. 26, 1939.  O. W. GITHENS ET AL  2,174,155
MOTION PICTURE CAMERA
Filed April 7, 1937   3 Sheets-Sheet 3

INVENTORS
OTTO W. GITHENS
GEORGE KENDE
BY EVERETT M. PORTER
ATTORNEY

Patented Sept. 26, 1939

2,174,155

UNITED STATES PATENT OFFICE 2,174,155

MOTION PICTURE CAMERA

Otto W. Githens and George Kende, New York, and Everett M. Porter, Brooklyn, N. Y., assignors, by mesne assignments, to Universal Camera Corporation, New York, N. Y., a corporation of Delaware Application April 7, 1937, Serial No. 135,410

8 Claims. (Cl. 88—17)

This invention relates to motion picture cameras. More particularly, it relates to an improved motor unit construction for motion picture cameras.

One of the objects of our invention is to provide a highly improved motor mechanism for a motion picture camera of the character described which shall be of unitary construction, which shall occupy relatively small space and thus be suitable for use in combination with motion picture cameras of relatively small size, and which shall include in the said unitary construction the film take-up and take-off spindles, as well as an improved speed control mechanism.

Another object of our invention is to provide in a camera motor unit construction, as described, a highly improved footage meter operating in synchronism with the motor mechanism.

Still another object of our invention is to provide in combination with a camera motor unit construction of the character described, highly improved starting and stopping means for the motor mechanism.

A still further object of our invention is to provide a highly improved camera motor unit of the character described, which shall comprise relatively few and simple parts, which shall be easy to assemble and relatively inexpensive to manufacture, which shall be highly compact and rugged in construction, and which at the same time shall operate with a high degree of efficiency for the purposes intended.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

Certain features described but not claimed in this application are described and claimed in the following co-pending applications: Serial Nos. 121,488; 122,688; 128,728, filed January 21, 1937, January 28, 1937, and March 3, 1937, respectively.

In the accompanying drawings, in which is shown one of the various possible embodiments of this invention, Fig. 1 is a side elevational view of a motion picture camera embodying our invention with portions of the side wall thereof broken away to disclose the interior mechanism;

Fig. 2 is a side elevational view of the motion picture camera illustrated in Fig. 1 but disclosing the opposite side of said camera;

Fig. 3 is a cross-sectional view taken substantially on the line 3—3 of Fig. 2;

Fig. 4 is a cross-sectional view taken substantially on the line 4—4 of Fig. 1;

Fig. 5 is an enlarged cross-sectional view taken substantially on the line 5—5 of Fig. 3;

Fig. 6 is a cross-sectional view taken substantially on the line 6—6 of Fig. 5;

Fig. 7 is a fragmentary detail view of a portion of the apparatus shown in Fig. 5, illustrating the operation thereof;

Figure 9:
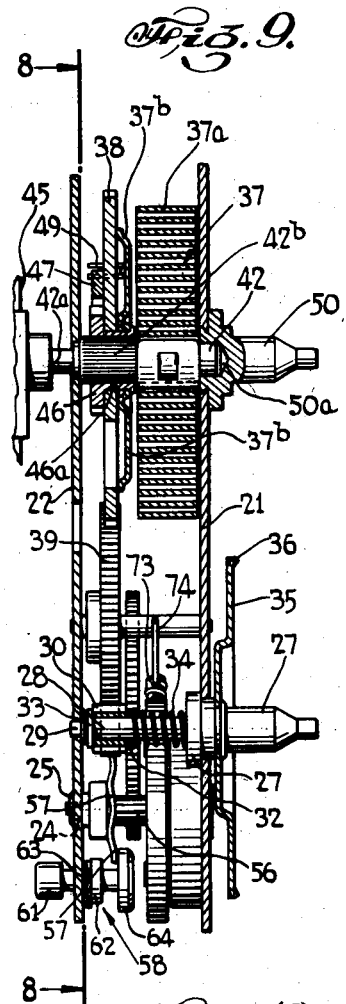
Fig. 9 is a cross-sectional view taken substantially on the line 9—9 of Fig. 8.

Referring now in detail to the drawings, and more particularly to Figs. 1 to 4 of sheet 1, there is disclosed an assembled motion picture camera 20 of the type fully disclosed and described in our said co-pending applications Ser. Nos. 121,488; 122,688 and 128,728. In the camera 20 there is housed within one part of the three-part camera casing, a highly improved and compact motor unit constructed in accordance with our present invention and comprising a pair of parallel metallic plates 21 and 22 held in spaced relationship by a plurality of spacing rods 23 (see Figs. 5 and 6), each having one end thereof riveted to the plate 21. The other ends of the said rods 23 are provided with reduced threaded portions which are designed to project through suitably registered apertures 24 in the plate 22, and held in position by the nuts 25. The plate 22 may be provided with a plurality of notched portions 26 (see Fig. 5) designed to furnish clearance for correspondingly positioned fastening lugs integral with the camera casing, not here shown but which is shown and fully described in our co-pending application Ser. No. 128,728. It is also noted that the plates 21 and 22 are substantially similar in contour to each other and to the contour of the camera casing, and are adapted to fit within one of the parts of said casing. One of the two plates, such as plate 21, is made slightly larger than the plate 22 so that the motor unit mounted on and between the said plates may be inserted within the said casing part so that the plate 22 will be disposed adjacent the bottom wall of said casing part, while the peripheral edge of the plate 21 is adapted to rest upon a shoulder portion adjacent the upper portion of said casing part disclosed in said co-pending application.

Rotatably mounted in the plate 21 is a take-up spindle 27 (see Fig. 9) which may be integral with the shaft 28, the end 29 of which is journalled in the plate 22. The take-up spindle 27 is adapted to be driven by a pinion 30 which is fixedly mounted on a ring 31 which in turn frictionally engages the shaft 28. A pair of washers 32 and 33 are disposed on either side of the pinion 30, the washer 33 being fixed to the shaft 28 while the washer 32 is freely mounted on said shaft 28. A spring 34, interposed between the washer 32 and a shoulder 27a on the shaft 28 contacting the plate 22, is adapted to maintain the pinion in proper position against the fixed washer 33. The above described mechanism constitutes the friction drive mechanism for the take-up spindle.

Fixed to the spindle 27 is a mounting plate 35 provided with ears 36 and adapted to receive and hold for rotation therewith a specially designed take-up spool not here shown, but which is fully shown and described in our said co-pending application Ser. No. 122,688. The take-up spindle 27 is adapted to be driven by the pinion 30 through the meshing gears 39 and 38, actuated by a spring motor 37. The gear 38 is rotatably mounted on the shaft 42, the opposite ends of which are journalled in the plates 21 and 22. The gear 39, meshing with the gear 38, is mounted on a shaft 43, the opposite ends of which are journalled in the plates 21 and 22. The gear 39 is adapted to mesh with the pinion 30 which drives the spindle 27 through the shaft 28. The motor 37 comprises a flat spirally wound spring 37a, the inner end of which is fixed to the shaft 42 while the outer end thereof is looped over the spacer bar 23 and permanently held in position in any suitable means, such as for example, a rivet 37b, shown in Fig. 8.

The end 42a of the shaft 42 which projects beyond the plate 22 and through an opening in the camera casing is screw-threaded to receive thereon a winding handle or bail 45 for winding the spring 37a (see Figs. 2, 3 and 9). To prevent unwinding of the spring 37a until such time as it is effectively used for driving the gear 38 to operate the camera mechanism, there is provided a ratchet wheel 46 which is rigidly mounted on the shaft 42 for rotation therewith, by any suitable means, such as for example, providing the said shaft 42 with a knurled portion 42b and correspondingly knurling the opening in the ratchet 46 to provide easy and quick assembly. The ratchet 46 is provided with an extended collar portion 46a upon which is rigidly fixed a spring guard plate 37b which is designed to rotate with the ratchet 46. The gear 38 is so mounted on the collar 46a that the spring may be wound without rotation of the said gear 38. Attached to the gear 38 is a pawl 47 pivotally mounted on a pivot 48 and adapted to cooperate with the ratchet wheel 46. The pawl 47 is normally urged in a direction to engage the teeth of the ratchet wheel 46 by means of a spring 49. It is thus seen that when the spring 37a unwinds to rotate the shaft 42, the ratchet 46 will also rotate with the said shaft 42. The pawl 47 normally in engagement with the ratchet teeth, and being fixed to the gear 38, will cause the rotation of the said gear 38, to drive the camera mechanism.

Non-rotatably attached to the plate 21 is a loading spindle 50 similar to the spindle 27 but adapted to receive thereon a spool containing a roll of unexposed film, as more fully described and shown in our said co-pending application Ser. No. 122,688. It is noted in Fig. 9 of the drawings that the spindle 50 and the shaft 42 are disposed in substantially axial alignment, and the spindle 50 is therefore provided with an opening 50a therein adapted to accommodate a portion of the shaft 42.

In mesh with a chain of gearing to be described is a pinion 51 (see Figs. 6 and 8) integrally mounted on a shaft 52 upon which is also mounted a pair of cams A and B for causing reciprocating motion of a pair of shuttles adapted to operate the film intermittent advance claw and the film shutter, the function and operation of which is fully described and shown in our said co-pending application Ser. No. 121,488. The shaft 52 has the opposite ends thereof journalled in the plates 21 and 22. The pinion 51 is adapted to be driven from the motor 37 by the gear 41 mounted on the shaft 44, the opposite ends of which are journalled in the plates 21 and 22. Also mounted on the shaft 40 for rotation therewith is a pinion 44, which in turn meshes with the gear 39 driven directly from the motor 37 by the gear 38 (see Fig. 8).

The following mechanism illustrated in Figs. 3 to 11 is provided for normally rendering the spring motor 37 ineffective to drive the above-mentioned chain of gears. On a shaft 55 having the opposite ends thereof journalled in the plates 21 and 22 there is mounted a pinion 56 which is designed to mesh with the gear 41. Mounted on the same shaft 55 for rotation therewith, is an annular disc or plate 57 which is preferably of wavy cross-sectional contour. Cooperating with the wavy plate 57 is a starting button device 58 comprising a shaft 59 which is designed to pass freely through an aperture 60 in the plate 22 and is provided at the outer end thereof with an enlarged head 61 suitable for the application of finger pressure thereto. The shaft 59 is also provided with a shoulder portion 62 spaced from the head 61 defining the limits of the axial movement of the shaft 59 within the aperture 60. The device 58 is supported by a flat spring 63, one end of which is attached to the shoulder 62 and shaft 59, and the other end of said spring 63 is held in fixed position by the spacer bar 23 and the plate 22, as clearly shown in Figs. 8 to 11 of the drawings. The opposite end of the shaft 59 from that of the head 61 disposed between the plates 21 and 22 is provided with an enlarged annular integral disc portion 64 which is of sufficient diameter so that a portion thereof overlaps a portion of the wavy plate 57. The spring 63 is so designed as to normally urge the disc 64 into frictional contact with the wavy plate 57.

Figure 10:
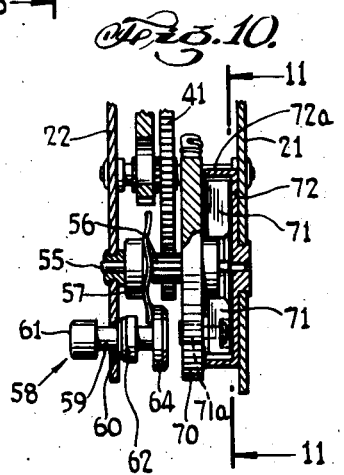
Fig. 10 is a cross-sectional view taken substantially on the line 10—10 of Fig. 8.

It is seen from the above described construction that the effective operation of the spring motor 37 to drive the chain of gearing hereinbefore described is normally prevented by the starting button device 58 by reason of the fact that the disc 64 is held in frictional contact with the wavy plate 57 which prevents rotation of the gear 56 which, in turn, prevents rotation of the gear 41, and so on. When it is desired to effectively use the camera for recording photographic images, it is merely necessary to exert a slight pressure, by a finger of the operator, on the head 61 of the starting button device 58, which moves the disc 64 out of contact with the wavy plate 57 against the action of the spring 63 and thus permits the rotation of the chain of gears for effectively driving the pinions 30 and 51 to operate the take-up spindle 27, and the intermittent film claw and shutter mechanism, respectively, as clearly shown and described in our said co-pending applications Ser. Nos. 121,488 and 122,688. By making the plate 57 of varying cross section, as shown in Figs. 9 and 10, we are able to stop the driving mechanism very quickly when the push button 58 is released, since there will be no possibility of frictional sliding between the plate 57 and the disc 64. For the same reason there will be practically instant starting of the motor to drive the camera mechanism whenever the head 61 of the push button 58 is pressed inwardly against the action of the spring 63.

Figure 8:
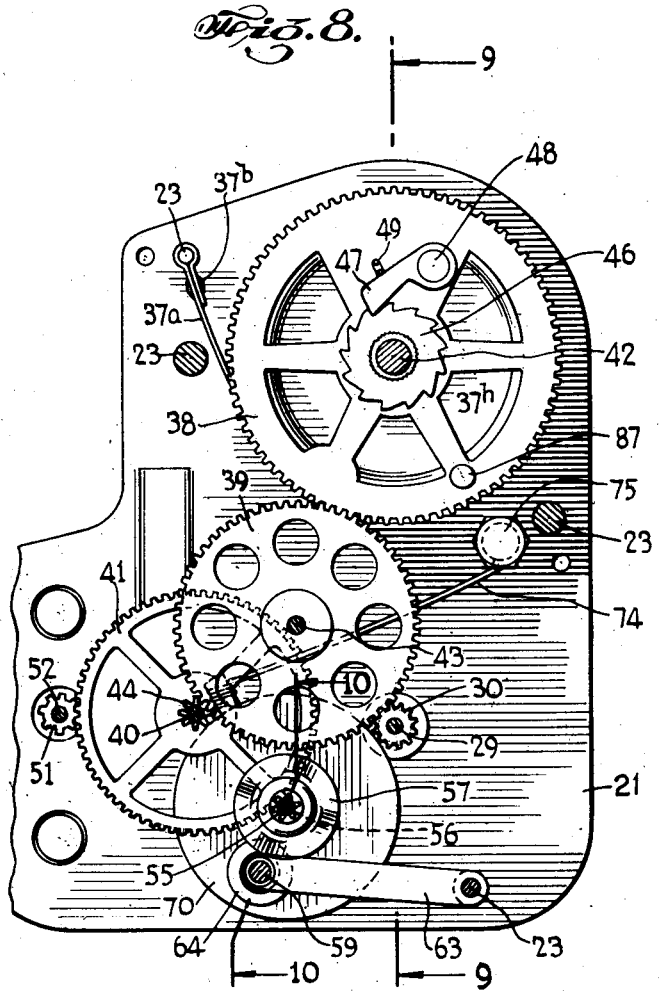
Fig. 8 is a cross-sectional view taken substantially on the line 8—8 of Fig. 9.
Figure 11:
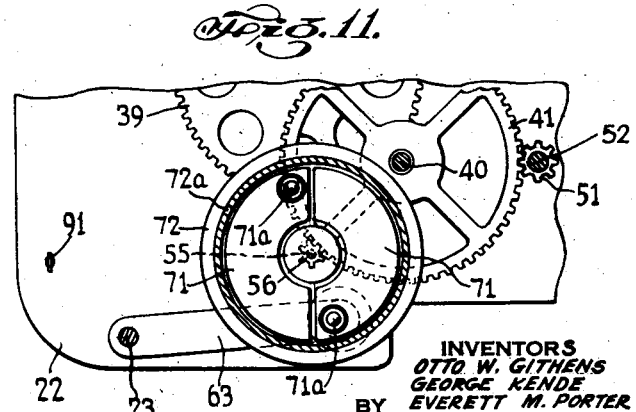
Fig. 11 is a cross-sectional view taken substantially on the line 11—11 of Fig. 10.

For controlling the speed of operation of the motor mechanism, there is provided an improved governor device which will now be described. Mounted on the shaft 55 for rotation therewith is an annular relatively heavy disc 70 which is caused to rotate whenever the push button device 58 is pressed in, to start the operation of the motor mechanism. On one flat side surface of the disc 70 there is provided a pair of substantially semi-circular members 71 (see Fig. 11) which are symmetrically disposed and pivotally mounted on said plate by means of a pair of diametrically opposed pivots 71a. These members 71 are housed within a hollow casing 72 open at the top and which is rigidly fixed to the plate 21. When properly assembled, the disc 70 is disposed adjacent the top of casing 72. The members 71 are so designed that when they are contiguously disposed as shown in Fig. 11, there will be a slight clearance between the inner surface of the surrounding wall 72a of the casing 72 and the circumferential periphery of the members 71. Upon rotation of the disc 70 the centrifugal force generated will cause the members 71 to swing outwardly on the pivots 71a, and upon reaching a predetermined speed, will frictionally contact the wall 72a to thereby lessen the speed of the pinion 56 and thus affect the speed of the motor 37. To prevent too rapid rotation of the disc 70, there is also provided a retarding member 73 which is adapted to frictionally contact the outer edge of the disc 70. The member 73 is held in frictional engagement with the surface of the disc 70 by resilient means, such as a spring 74, one end of which is adapted to carry the member 73 and the other end thereof being secured to a suitable supporting post 75 fixed to the plate 21, as shown in Fig. 8.

By our invention we have also incorporated in the unitary motor construction above described, a mechanism for registering the amount of unexposed film. The film footage counter comprises a member 80 which is pivotally mounted on the plate 22 by means of an enlarged headed fixed pivot 81. The member 80 comprises a flat portion 80a thereof adapted to overlie the outer surface of the plate 22 and another portion 80b integral with the portion 80a but offset in a different plane therefrom so that the portion 80b will overlie the opposite or inner surface of the plate 22. An opening 82 is provided in the plate 22 of suitable size and shape to permit the insertion of the portion 80b therethrough and to provide clearance for pivotal movement. The amount of pivotal movement of the member 80 is restricted by a pin projection 83 fixed to the portion 80a and designed to operate in an enlarged opening 84 in the plate 22. This opening is of such size as to permit a predetermined amount of pivotal movement of the member 80 therein (see Fig. 5) for reasons which will soon become apparent. The member 80 is normally held in the limit of its counter-clockwise pivotal movement by means of a spring 85, one end of which is attached to the plate 22 by an enlarged headed pin 86, while the free end of the spring 85 is designed to resiliently abut the pin 83, as shown. If desired, the pin 83 may be provided with an annular peripheral groove to retain the spring 85 in proper position. Designed for synchronous operation with the member 80 is a pin projection 87 mounted on the flat surface of the gear 38 for rotational movement therewith. The edge 80c of the portion 80b is cammed, as shown, and the projection 87 is disposed in the path of said cammed portion 80c so that whenever the motor mechanism is in effective operation to rotate the gear 38, the pin 87, after making a complete revolution, will strike the cammed surface 80c and pivotally move the member 80 in a downward or clockwise direction.

It is noted that a portion of the member 80 is provided with a substantially squared corner 80d which is designed to cooperate with a rotatably mounted ratchet wheel 88 mounted on the plate 22. The teeth of the ratchet wheel 88 are so designed that upon each revolution of the pin 87, the member 80 will be rotated in a clockwise direction so that the portion 80d thereof will engage one of the teeth of the ratchet wheel 88 to turn said ratchet wheel in a counter-clockwise direction a predetermined distance. The member 80 may be provided with a slotted aperture 81a surrounding the shank of the pivot 81 to permit sufficient inward sliding movement of the member 80 when the pin 87 engages the cammed surface 80c and the portion 80d engages a tooth of the ratchet wheel 88. Suitable markings 89 are provided on the top surface of the ratchet wheel 88 which are designed to be visible through an aperture in the adjacent wall of the casing part in which the motor unit is mounted. The number, visible through the outside of the casing, will register the number of feet of unexposed film. To prevent clockwise rotation of the ratchet wheel 88 and at the same time to hold the said wheel against undesired counter-clockwise rotational movement, there is provided a resilient member, such as a spring 90, one end 90a of which is attached to the plate 22 by any suitable attaching means, such as a downwardly projecting portion 91 of said spring being received in a corresponding aperture in the plate 22 and swaged or weldedly held therein, while the other end 90b of the spring 90 resiliently contacts the ratchet teeth to prevent rotation of said ratchet wheel in a clockwise direction. A knurled knob member 92 may be provided on the ratchet wheel 88 in order to turn the same by hand to the proper starting point against the action of the spring 90 when the camera is first loaded.

The motor unit construction described above is also designed to be utilized as an aid in assembling the casing parts of the camera. Thus, for example, the plate 21 is provided with threaded holes 94 designed to have attached thereto the film claw shutter movement unit, as fully shown and described in said co-pending application Ser. No. 121,488. Also, the plate 21 is provided with means such as a pair of opposed notched lugs 95 designed to cooperate with a cam locking member 75 carried by a second camera casing part in the manner fully shown and described in our said co-pending application Ser. No. 128,728.

It is thus seen from the above description that by our invention we have provided a highly compact motor unit assembly contained between a pair of spaced parallel plates, which may also include the take-up and take-off spindles, film footage counter, and a starting and stopping mechanism which may all be assembled as a complete unit and then inserted into one of the parts of a three-part casing, such as fully shown and described in our said co-pending application Ser. No. 128,728.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described our invention, we claim as new and desire to secure by Letters patent:

1. In a motor unit for a motion picture camera having a pair of spaced parallel plates and a spring motor supported between the plates, releasable means for normally preventing the effective operation of said motor, said last named means comprising a shaft journalled in said plates, a pinion on said shaft adapted to be driven by said motor, a wavy disc fixed to said shaft for rotation therewith and a releasable push button member having a portion thereof frictionally cooperating with said disc.

2. In a motor unit for a motion picture camera having a pair of spaced parallel plates and a spring motor supported between the plates, releasable means for normally preventing the effective operation of said motor, said last named means comprising a shaft journalled in said plates, a pinion on said shaft adapted to be driven by said motor, a wavy disc fixed to said shaft for rotation therewith and a releasable push button member having a portion thereof frictionally cooperating with said disc, means for supporting said push button member comprising a spring having one end thereof fixed to one of said plates and the other end thereof fixed to said push button member whereby to resiliently urge the said portion of said push button into frictional contact with said disc.

3. In a motor unit for a motion picture camera having a pair of spaced parallel plates and a spring motor supported between the plates, releasable means for normally preventing the effective operation of said motor, said last named means comprising a shaft journalled in said plates, a pinion on said shaft adapted to be driven by said motor, a wavy disc fixed to said shaft for rotation therewith and a releasable push button member having a portion thereof frictionally cooperating with said disc, means for supporting said push button member comprising a spring having one end thereof fixed to one of said plates and the other end thereof fixed to said push button member whereby to resiliently urge the said portion of said push button into frictional contact with said disc, a portion of said push button being adapted to pass freely through an aperture in said plate carrying said spring.

4. In a motion picture camera having a spring motor unit for operating the camera mechanism, releasable means for normally preventing the operation of said motor, said means comprising a rotatably mounted shaft, adapted to be driven by said motor, a pinion, a wavy disc, said pinion and said disc being mounted on said shaft for rotation therewith, a second shaft provided with an enlarged disc portion, resilient means for non-rotatably supporting said second shaft on said unit whereby to normally urge said enlarged disc portion into frictional contact with said wavy disc.

5. In a motor unit for a motion picture camera having a pair of spaced parallel plates and a spring motor supported between the plates, releasable means for normally preventing the effective operation of said motor, said last named means comprising a shaft journalled in said plates, a pinion on said shaft adapted to be driven by said motor, a disc fixed to said shaft for rotation therewith, a releasable push button member having a portion thereof frictionally cooperating with said disc, and a governor comprising a disc mounted on said shaft for rotation therewith.

6. In a motor unit for a motion picture camera having a pair of spaced parallel plates and a spring motor supported between the plates, releasable means for normally preventing the effective operation of said motor, said last named means comprising a shaft journalled in said plates, a pinion on said shaft adapted to be driven by said motor, a disc fixed to said shaft for rotation therewith, a releasable push button member having a portion thereof frictionally cooperating with said disc, and a governor comprising a disc mounted on said shaft for rotation therewith, a stationary cup shaped member fixed to one of said plates and a pair of inertia members pivotally mounted on said disc, said inertia members being received in said cup shaped member, said pivotally mounted members being adapted to project outwardly by centrifugal force into frictional contact with the inner wall of said cup-shaped member.

7. In a motion picture camera having a spring motor unit for operating the camera mechanism, in combination, releasable means for normally preventing the operation of said motor, said means comprising a rotatably mounted shaft adapted to be driven by said motor, a pinion, a wavy disc, said pinion and said disc being mounted on said shaft for rotation therewith, a second shaft provided with an enlarged disc portion, resilient means for non-rotatably supporting said second shaft on said unit whereby to normally urge said enlarged disc portion into frictional contact with said wavy disc, and a governor comprising a disc mounted on said shaft for rotation therewith, a stationary cup shaped member fixed to one of said plates and a pair of inertia members pivotally mounted on said disc, said inertia members being received in said cup shaped member, said pivotally mounted members being adapted to project outwardly by centrifugal force into frictional contact with the inner wall of said cup shaped member.

8. In a motor unit for a motion picture camera having a pair of spaced parallel plates and a spring motor supported between the plates, releasable means for normally preventing the effective operation of said motor, said last named means comprising a shaft journalled in said plates, a pinion on said shaft adapted to be driven by said motor, a disc fixed to said shaft for rotation therewith, a releasable push button member having a portion thereof frictionally cooperating with said disc, and speed retarding means comprising a disc mounted on said shaft for rotation therewith, a friction member and means for resiliently supporting said friction member whereby to urge the same into frictional contact with said disc.

OTTO W. GITHENS.
GEORGE KENDE.
EVERETT M. PORTER.